(12) United States Patent
Marshall

(10) Patent No.: US 6,439,873 B1
(45) Date of Patent: Aug. 27, 2002

(54) GOLF BALL CASTING MOLD ASSEMBLY

(75) Inventor: Gary G. Marshall, Soddy Daisy, TN (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/495,583

(22) Filed: Feb. 1, 2000

(51) Int. Cl.⁷ .................. B29C 33/30; B29C 39/10; B29C 45/14

(52) U.S. Cl. ............... 425/116; 425/195; 425/572; 425/588; 425/408

(58) Field of Search .................. 425/116, 572, 425/588, 195, 408

(56) References Cited

U.S. PATENT DOCUMENTS

| | | | |
|---|---|---|---|
| 721,462 A | 2/1903 | Richards | 264/275 |
| 2,940,128 A | 6/1960 | Bowerman et al. | |
| 3,034,791 A | 5/1962 | Gallagher | |
| 3,068,522 A | 12/1962 | Nickerson et al. | |
| 3,112,521 A | 12/1963 | Ward | |
| 3,130,102 A | 4/1964 | Watson et al. | |
| 3,147,324 A | 9/1964 | Ward | 264/254 |
| 3,177,280 A | 4/1965 | Ford et al. | 264/275 |
| 3,616,101 A | 10/1971 | Satchell et al. | 264/302 |
| 3,867,080 A * | 2/1975 | Bruder | 425/572 |
| 3,979,126 A | 9/1976 | Dusbiber | |
| 3,989,568 A | 11/1976 | Isaac | 156/182 |
| 4,123,061 A | 10/1978 | Dusbiber | |
| 4,199,313 A * | 4/1980 | Bohnenberger | 425/408 |
| 4,203,941 A | 5/1980 | Brooker | 264/250 |
| 4,795,125 A * | 1/1989 | Boros et al. | 425/195 |
| 4,959,000 A | 9/1990 | Giza | 425/116 |
| 5,006,288 A | 4/1991 | Rhodes, Jr. et al. | 264/275 |
| 5,006,297 A | 4/1991 | Brown et al. | 264/278 |
| 5,112,556 A | 5/1992 | Miller | 264/279 |
| 5,194,191 A | 3/1993 | Nomura et al. | 264/234 |
| 5,334,673 A | 8/1994 | Wu | |
| 5,368,800 A * | 11/1994 | Scolamiero et al. | 264/219 |
| 5,388,982 A * | 2/1995 | Takahashi et al. | 425/572 |
| 5,484,870 A | 1/1996 | Wu | |
| 5,692,974 A | 12/1997 | Wu et al. | |
| 5,703,193 A | 12/1997 | Rosenberg et al. | |
| 5,733,428 A | 3/1998 | Calabria et al. | 264/254 |
| 5,795,596 A * | 8/1998 | Stanton et al. | 425/408 |
| 5,827,548 A * | 10/1998 | Lavallee et al. | 425/116 |
| 5,885,172 A | 3/1999 | Hebert et al. | 473/354 |
| 5,888,437 A | 3/1999 | Calabria et al. | 425/125 |
| 5,897,884 A | 4/1999 | Calabria et al. | 425/116 |
| 5,908,358 A | 6/1999 | Wu | 473/378 |
| 5,947,843 A | 9/1999 | Calabria et al. | 264/254 |

FOREIGN PATENT DOCUMENTS

| | | | |
|---|---|---|---|
| JP | 57-8105 A * | 1/1982 | 425/195 |
| WO | WO 99/43394 | 2/1999 | |

* cited by examiner

Primary Examiner—Robert Davis
(74) Attorney, Agent, or Firm—Michael A. Catania

(57) ABSTRACT

A mold assembly designed for casting a layer for a golf ball is disclosed herein. The mold assembly has two halves that each hold a plurality of mold inserts. Each mold half is composed of a carrier base, a carrier plate, a retainer plate and a plurality of mold inserts. The multiple component aspect of each mold half allows for a more efficient transfer of heat during a casting process. Preferably, the mold assembly is utilized to mold a polyurethane cover on a golf ball precursor product.

19 Claims, 8 Drawing Sheets

GOLF BALL CASTING MOLD ASSEMBLY

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a mold for forming a golf ball cover layer. More specifically, the present invention relates to a mold for forming a thermoset polyurethane cover on a golf ball core.

2. Description of the Related Art

Golf balls may comprise one-piece constructions or they may include several layers including a core, one or more intermediate layers and an outer cover that surrounds any intermediate layer and the core. In multi-component golf balls, there exists an inner core. Often, this core is made by winding a band of elastomeric material about a spherical elastomeric or liquid-filled center. Alternatively, the core may be a unitary spherical core made of a suitable solid elastomeric material. One such material that is conventionally used for the core of golf balls is a base rubber, such as polybutadiene, which is cross-linked with a metal acrylate, such as zinc diacrylate.

In the construction of some multi-component golf balls, an intermediate boundary layer is provided outside and surrounding the core. This intermediate boundary layer is thus disposed between the core and the outer cover of the golf ball.

Located outwardly of the core and any intermediate boundary layer is a cover. The cover is typically made from any number of thermoplastic or thermosetting materials, including thermoplastic resins such as ionomeric, polyester, polyetherester or polyetheramide resins; thermoplastic or thermoset polyurethanes; natural or synthetic rubbers such as balata (natural or synthetic) or polybutadiene; or some combination of the above.

Golf balls are typically manufactured by various molding processes, whether one-component or multicomponent balls. Generally, the core of the golf ball is formed by casting, compression molding, injection molding or the like. If an intermediate boundary layer is desired, one or more intermediate boundary layers are added over the core by any number of molding operations, including casing, compression molding, and/or injection molding. The cover is then formed over the core and intermediate boundary layers, if present, through casting, compression molding, and/or injection molding.

One of the earliest disclosures of manufacturing a golf ball with dimples is set forth in U.S. Pat. No. 721,462 to Richards, which was filed on May 26, 1902. Richards discloses covering a core that is centered with pins within a spherical cavity of a mold, with a fluent gutta percha material. The gutta percha material is subjected to high pressure and then cooled within the mold to form a cover on the core.

Bowerman et al., U.S. Pat. No. 2,940,128, which was filed on May 14, 1958, discloses a method of manufacturing a rubber covered golf ball. Bowerman discloses separately forming rubber hemispherical covers on the core.

One of the earliest methods of manufacturing a polyurethane cover is disclosed in Gallagher, U.S. Pat. No. 3,034,791, which was filed on Apr. 26, 1960. Gallagher discloses forming polyurethane disks that are then molded over cores to create a polyurethane cover.

Another early method of manufacturing a polyurethane cover is disclosed in Ward, U.S. Pat. No. 3,147,324, which was filed on Oct. 20, 1960. Ward discloses using a liquid polyurethane prepolymer, either polyether-type or polyester-type, that is cured with a diamine. The liquid polyurethane is poured into a hemispherical mold cavity of a mold half, and a wound golf ball core is centered therein. Subsequently, a corresponding hemispherical mold cavity of a second mold half is filled with the liquid polyurethane. The first mold half with the wound core is then mated with the second mold half and allowed to cure for a set period of time.

A second Ward patent directed toward forming a polyurethane cover is U.S. Pat. No. 3,112,521, which was filed on Mar. 8, 1961. The '521 Ward patent discloses a method and apparatus for sensing the center of a wound core prior to placement in a mold filled with liquid polyurethane which is part of a complete casting machine. As with the '324 Ward patent, liquid polyurethane is poured into a hemispherical mold cavity of a mold half. However, in the '521 Ward patent, the wound core is more precisely centered prior to insertion into the polyurethane filled cavity. The entire process of the '521 Ward patent is performed on a rotatable annular platform.

Another example of a method for making a polyurethane cover is disclosed in Watson et al., U.S. Pat. No. 3,130,102, filed originally in Great Britain on May 19, 1960. Watson discloses a process for partially forming polyurethane half-shells for a golf ball, cooling them, then fusing them together on a core while imparting a dimple pattern thereon. Watson also demonstrates better cutting resistance for its polyurethane covered golf ball. An alternative of the Watson process for making a polyurethane cover on a golf ball is disclosed in a related patent to Ford et al., U.S. Pat. No. 3,177,280, filed originally in Great Britain on May 23, 1960. Ford discloses coating a core until the required thickness is applied, however, it still requires interrupting the curing, to place the coated core into a mold to impart a dimple pattern thereon.

Building upon Ford and Watson, U.S. Pat. No. 3,989,568 to Isaac discloses a process for using curing agents that have different reaction rates to partially cure a polyurethane half shell that is later placed on a core for further processing. Isaac discloses that a cover may be as thin as 0.025 inches using this process which involves two different diisocyanates and different amine curing agents. Dusbiber, U.S. Pat. No. 3,979,126, originally filed in February of 1965, discloses another method of making polyurethane half shells for a golf ball cover.

Brown et al., U.S. Pat. No. 5,006,297, filed on Feb. 22, 1989, discloses openly curing both halves of polyurethane cover in an initial mold, then compression molding the smooth covered golf ball to form a dimple pattern thereon. The initial molding step may use retractable or non-retractable pins to center the wound core while polyurethane flows about it.

Wu, U.S. Pat. No. 5,334,673 discloses the multiple step process of Ford and Watson using a slow-reacting polyamine curing agent. Wu et al., U.S. Pat. No. 5,692, 974 discloses the difficulty in manufacturing a commercially viable polyurethane covered golf ball due to the centering of the core within a partially cured mixture of polyurethane. The '974

Wu patent states that the 1993 Titleist® PROFESSIONAL was the first successful polyurethane covered golf ball.

Calabria et al., U.S. Pat. Nos. 5,733,428; 5,888,437; 5,897,884; and 5,947,843 all originate from an application filed on Jan. 21, 1994 which was a continuation-in-part application of an abandoned application filed on Jul. 6, 1992. The Calabria family of patents disclose a method and apparatus for forming a wound core golf ball with a polyurethane cover. The apparatus of Calabria, similar to that of the '521 Ward patent, inserts a wound core into a half mold cavity of partially cured polyurethane. Calabria discloses using a single insertion device for each individual mold. Calabria introduces the polyurethane mixture into a top mold half and after 50 to 80 seconds later a core is lowered at a controlled rate to prevent air bubbles, and a stop limits the downward movement of the core into the mold cavity. At a later time the bottom mold halves are filled with the polyurethane mixture. After another 50 to 80 seconds, the vacuum holding the core is released and mold halves are removed from the centering fixture. The top mold halves are then mated with the bottom mold halves and excess material resides in sprue channels. The mold halves are heated and pressurized for a predetermined period of time, and then demolded.

Herbert et al., U.S. Pat. No. 5,885,172, which was filed on May 27, 1997, discloses using the process of Calabria to form a polyurethane cover over a core with an inner layer thereon. Wu, U.S. Pat. No. 5,908,358, which was originally filed on Jun. 7, 1995, discloses using a four mold unit to manufacture golf balls with polyurethane covers.

Dewanjee, et al., PCT International Publication Number WO 99/43394, claiming priority from U.S. patent application Ser. No. 09/030,332, filed on Feb. 25, 1998 discloses a method for forming a polyurethane cover on a golf ball. Dewanjee discloses using a X–Y table to position mold halves under a mix head that dispenses the polyurethane mixture. The mold halves are then placed on a conveyor for transport to a core insertion station. The cores are then centered over each cavity through use of a pin on the mold half that engages with an aperture on the core holding unit. A second mold half is mated with the first mold half, and the mold is heated under pressure to form a polyurethane cover over the core. De-molding is accomplished through insertion of mold releasing pins into apertures of the mold halves.

Consequently, there remains a need for methods of manufacturing golf balls that do not suffer from the above disadvantages. Moreover, the methods would preferably decrease the production time to manufacture golf balls.

BRIEF SUMMARY OF THE INVENTION

The mold assembly of the present invention is able to provide a solution to the problems of the prior art. The present invention is able to accomplish this by providing a novel mold assembly design that allows for a greater number of golf ball precursor products to be processed simultaneously, and allows for a more efficient transfer of heat during the casting process.

One aspect of the present invention is a mold assembly for forming a layer on a golf ball precursor product. The mold assembly includes a first mold half and a second mold half. The first mold half includes a first central hub mechanism having a first plurality of hemispherical cavities disposed circularly equidistant about the first central hub mechanism, and a second central hub mechanism having a second plurality of hemispherical cavities disposed circularly equidistant about the second central hub mechanism. The second mold half includes a third central hub mechanism having a third plurality of hemispherical cavities disposed circularly equidistant about the third central hub mechanism, and a fourth central hub mechanism having a fourth plurality of hemispherical cavities disposed circularly equidistant about the fourth central hub mechanism. The first and second central hub mechanisms engage with the third and fourth central hub mechanisms during mating of the first mold half with the second mold half.

Another aspect of the present invention is mold assembly that includes multiple-component first and second mold halves. The first and second mold halves each include a carrier base, a carrier plate, a plurality of mold inserts and a retainer plate. Each carrier base has a plurality of studs extending from an interior surface. Each carrier plate has a plurality of insert apertures with each having a first diameter and a plurality of hub apertures therein. Each carrier plate is mounted on the plurality of studs of the carrier base. Each of the plurality of mold inserts is disposed within a corresponding insert aperture of the plurality of insert apertures. Each retainer plate has a plurality of insert apertures with each having a second diameter. Each retainer plate is mounted on the carrier plate, and each of the plurality of insert apertures is positioned above a corresponding mold insert of the plurality of mold inserts.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in FIGS. 1–5, a mold assembly for casting a layer of a thermoset material on a golf ball precursor product is generally designated 20, and is composed of a first mold half 22a and a second mold half 22b. In a preferred embodiment, the first mold half 22a is the top mold half and the second mold half 22b is the bottom mold half. The mold halves 22a–b are mated together during a casting process as set forth in co-pending U.S. patent application Ser. No. 09/496,126 filed Feb. 1, 2000, entitled System And Method For Cast Molding A Golf Ball, which is hereby incorporated in its entirety by reference.

Figure 1:
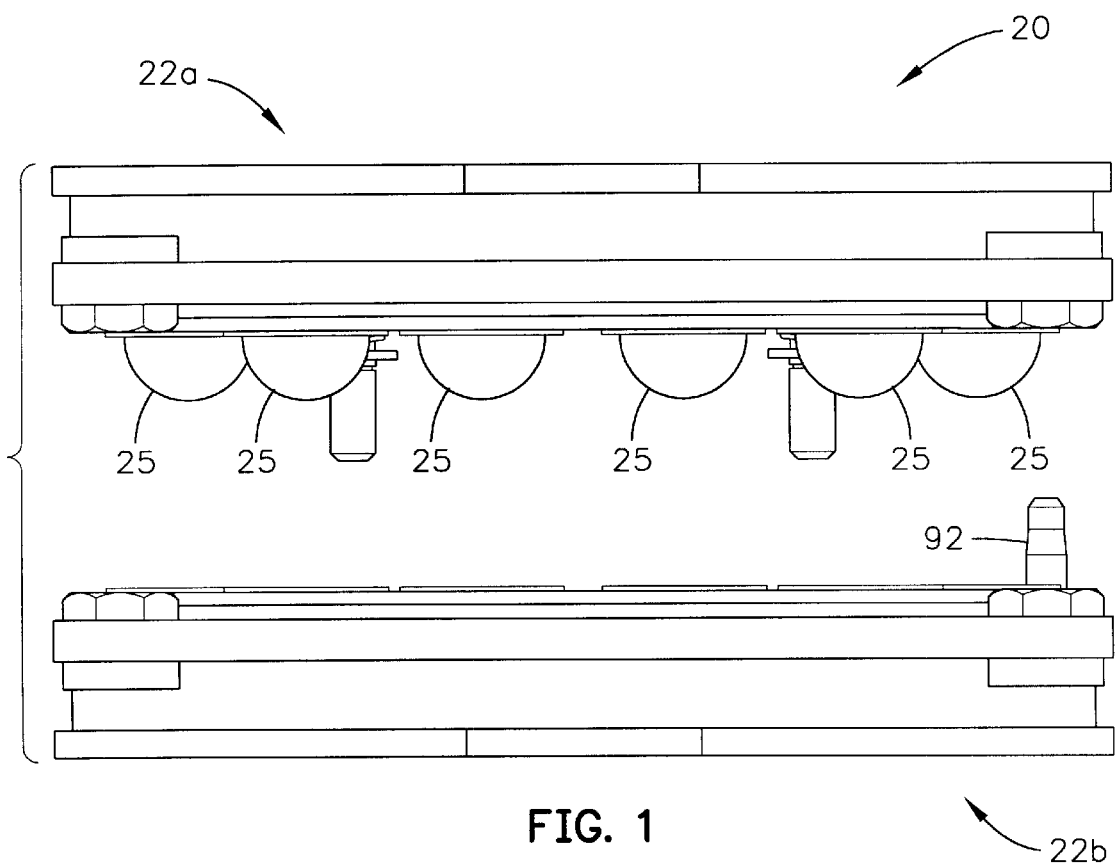
FIG. 1 is a side view of a mold assembly of the present invention.
Figure 1A:
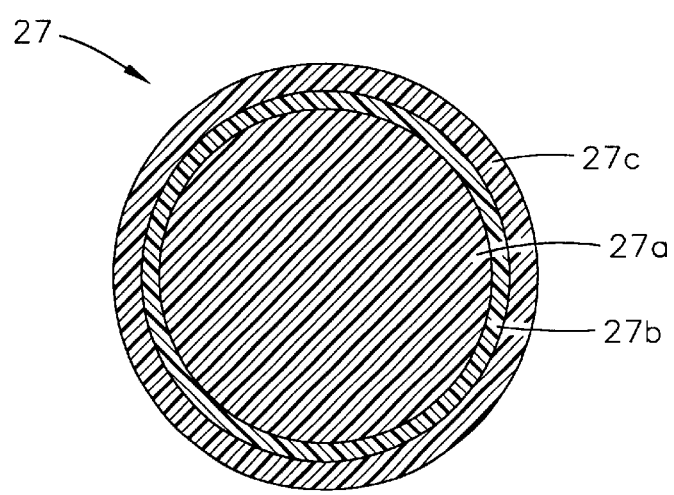
FIG. 1A is a cross-sectional view of a golf ball.

As shown in FIG. 1, a set of golf ball precursor products 25 are placed within the first mold half 22a which is inverted for mating with the second mold half 22b. The golf ball precursor products 25 may be a core (solid, liquid or hollow) that is wound or non-wound. Each golf ball precursor product 25 may also have one or more intermediate or boundary layers over the core portion. The thermoset material layer that is casted in the mold assembly 20 is preferably the cover layer 27c of the golf ball 27, however, it may also be the boundary layer 27b. A preferred thermoset material is polyurethane such as described in U.S. Pat. No. 6,117,024, entitled Polyurethane Cover For A Golf Ball, which pertinent parts are hereby incorporated by reference. However, those skilled in the relevant art will recognize that other thermoset materials may be used with the mold assembly 20 without departing from the scope and spirit of the present invention.

Referring again to FIGS. 1–5, each mold half 22a–b is generally composed of a carrier base 24, a carrier plate 26 and a retainer plate 28. Each mold half 22a–b also has a plurality of mold inserts 30 positioned within mold insert apertures 31 of the retainer plate 28 and mold insert apertures 33 of the carrier plate 26.

The carrier plate 26 is sandwiched between the carrier base 24 and the retainer plate 28. The carrier plate 26 carries the mold inserts 30 during the casting process. The retainer plate 28 is designed to lock each of the mold inserts 30 in the carrier plate 26. The carrier base 24 is the mold assembly's 20 contact surface during conveyance through a casting system.

Figure 6:
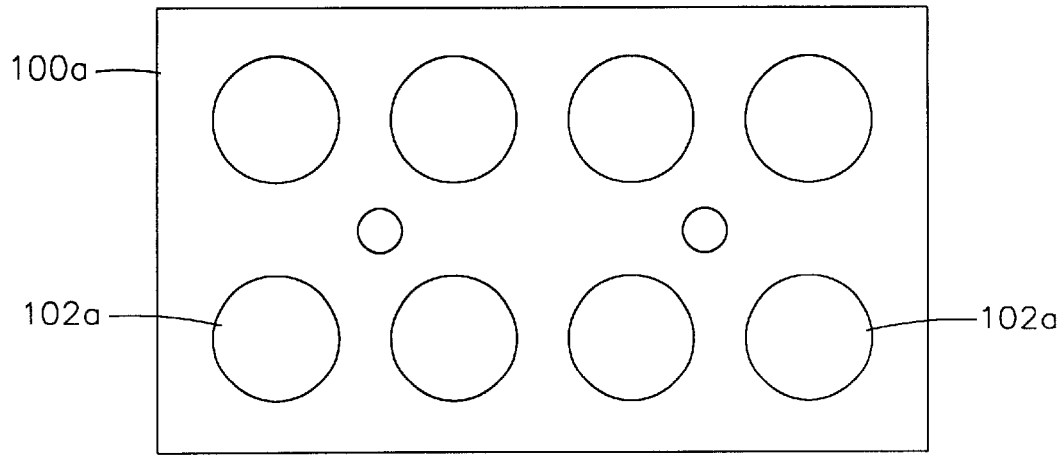
FIG. 6 is a schematic top plan view of a mold half of the prior art.
Figure 6A:
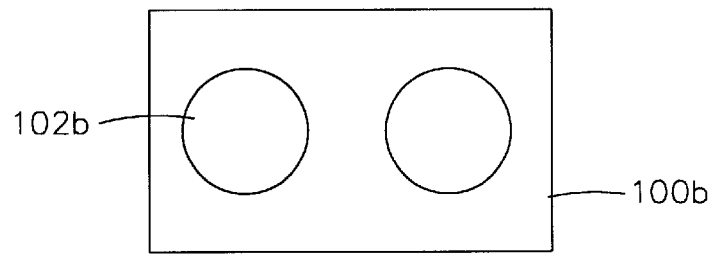
FIG. 6A is a schematic top plan view of another mold half of the prior art.
Figure 7:
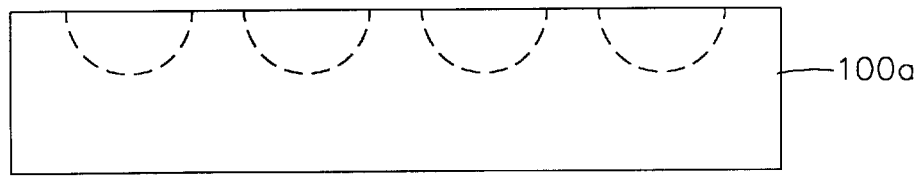
FIG. 7 is a schematic side view of the mold half of FIG. 6.

Compared to the solid one-piece body mold halves 100a–b of the prior art illustrated in FIGS. 6, 6A and 7, each mold half 22a–b of the present invention is composed of multiple stacked components that minimize the mass of the mold assembly 20 while providing sufficient structural support to withstand the high pressure forces during the casting process. The multiple component structure of each mold half 22a–b allows for a more efficient transfer of heat to the mold halves 22a–b than the prior art since there is less metal per mold cavity. Further, the mold halves 100a–b of the prior art had the cavities 102a–b as part of the body of the mold half 100a–b. The mold halves 22a–b are heated to prevent problems with the dispersion of the exothermic thermoset material into each mold cavity. Further, the mold assembly 20 is capable of casting a layer on a greater number of golf ball precursor products 25 than the prior art mold assemblies.

Figure 8:
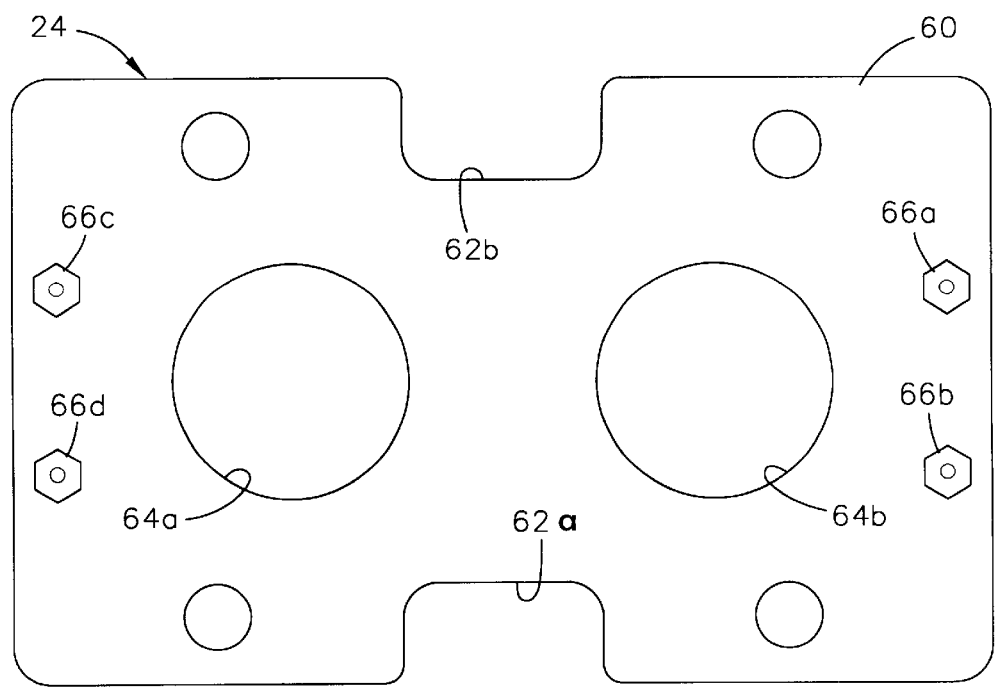
FIG. 8 is a top plan view of a carrier base of a mold half of a mold assembly of the present invention.

As shown in FIG. 8, the carrier base 24 has a substantially flat body 60 and is preferably composed of a rolled steel material. The thickness of the carrier base 24 is between 0.2 and 1.0 inches. The body 60 has two cut-outs 62a–b located in the center for stopping on a casting apparatus. The body 60 also has two hub apertures 64a–b for assembling of the mold half 22. The body 60 also has stud spacers 66a–d that elevate the carrier plate 26 approximately 1.0 inch.

Figure 9:
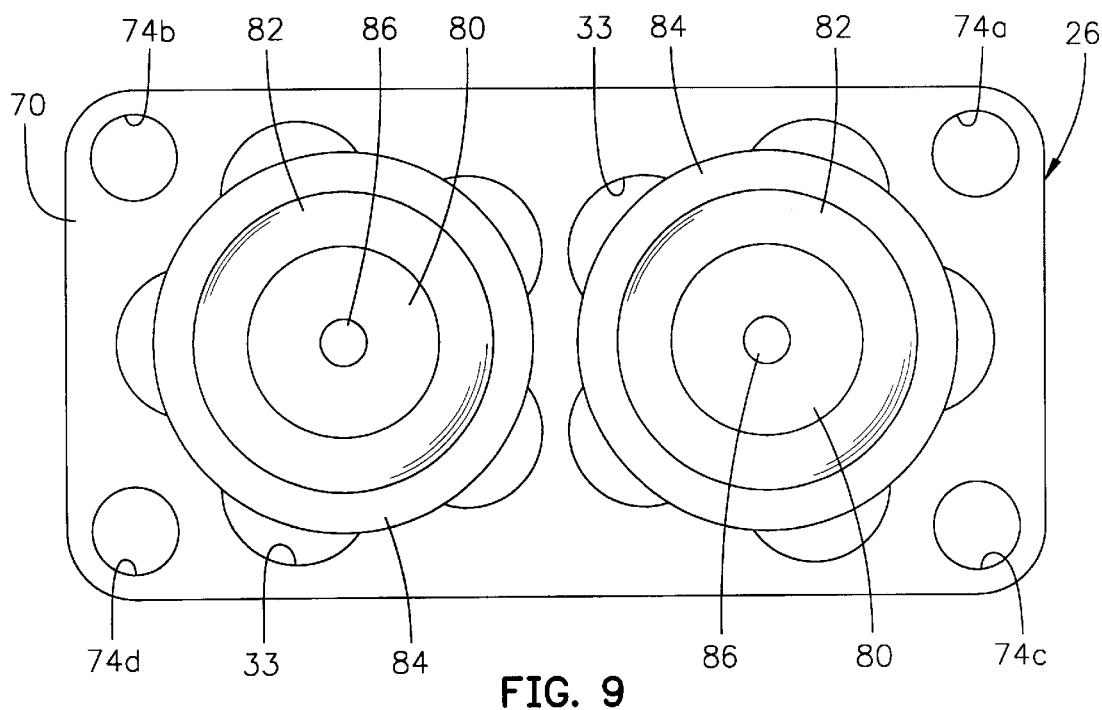
FIG. 9 is a bottom plan view of a carrier plate of a mold half of a mold assembly of the present invention
Figure 10:
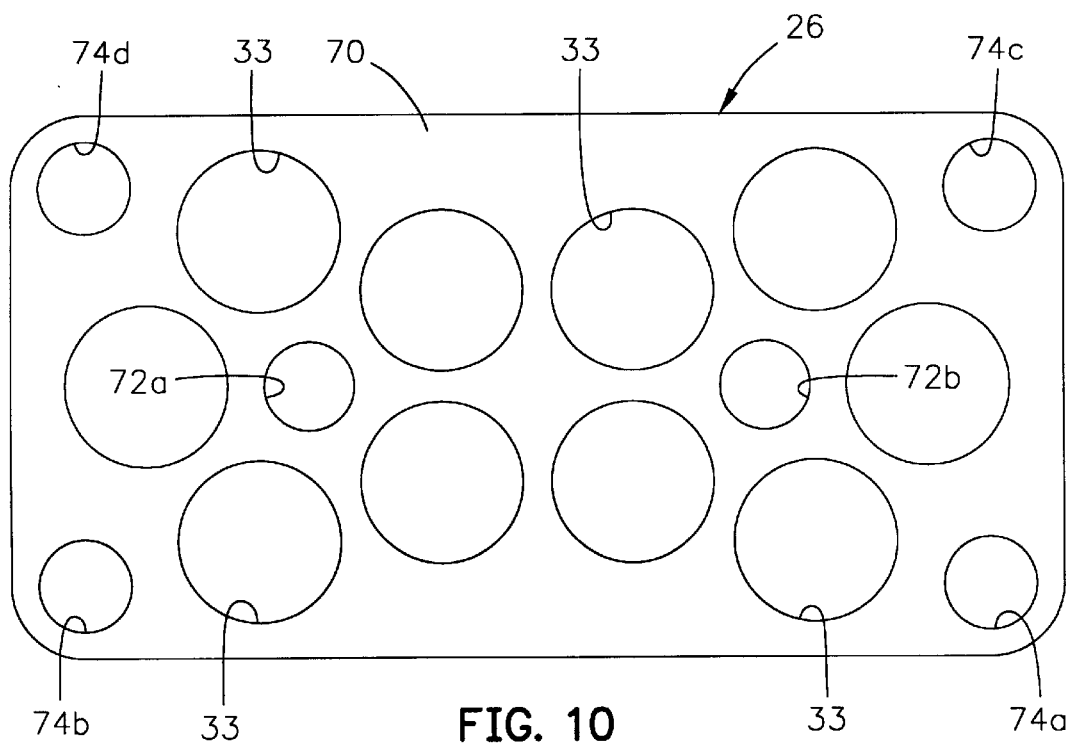
FIG. 10 is a top plan view of a carrier plate of a mold half of a mold assembly of the present invention.

As shown in FIGS. 9 and 10, the carrier plate 26 is mounted on top of the carrier base 24. The carrier plate 26 has a body 70 has a thickness that is preferably between 0.3 and 1.0 inches. The body 70 is preferably composed of a mild steel material. The body 70 has two equal sets of insert apertures 33 for housing each of the mold inserts 30. Each set of insert apertures 33 is positioned about a hub aperture 72a–b. The insert apertures 33 are equidistant from their respective hub aperture 72, and equidistant from each other within the set. Preferably, the insert apertures each have a diameter that ranges from 2.00 to 3.00 inches, and each diameter is larger than the diameter of the mold insert 30. The body 70 also has locating apertures 74a–d at each corner for mounting locating pins 92a–b and locating bushings 94a–b.

The locating pins 92a–b and bushings 94a–b properly align the mold halves 22a–b during mating thereof to form the mold assembly 20. In a preferred embodiment, the locating pins 92a–b are diagonally opposed to each other on the second mold half 22b. The locating bushings 94a–b are disposed on the first mold half 22a Each locating pin 92a–b may be extended or retracted for molding and de-molding purposes. The top of each locating pins 92a–b is tapered or indented for assistance during the de-molding separation of the first and second mold halves 22a–b. Alternatively, the locating pins 92a–b may be fixed with a double tapered top.

The hub mechanisms 40 are placed through the aforementioned hub apertures 72a–b on each of the mold halves 22a–b. Each hub mechanism 40a–b for the first mold half 22a has a stud adapter 80, a spring 82, a backing plate 84 and a bolt 86. Each hub mechanism 40c–d for the second mold half 22b has a stud adapter 80, a spring 82, a backing plate 84 and a nut 88. When the first mold half 22a is mated with the second mold half 22b, each bolt 86 is connected with a corresponding nut 88. Preferably, the bolts 86 are threadingly connected to the nuts 88, and each bolt 86 has a spring 90 attached thereto to keep the bolt 86 extended through the carrier plate 26. Those skilled in the art will recognize that the bolts 86 may be used on the second or bottom mold half 22b and the nuts 88 on the top or first mold half 22a. Further, those skilled in the art will recognize that each mold half 22a–b may have one nut 88 and one bolt 86.

Figure 11:
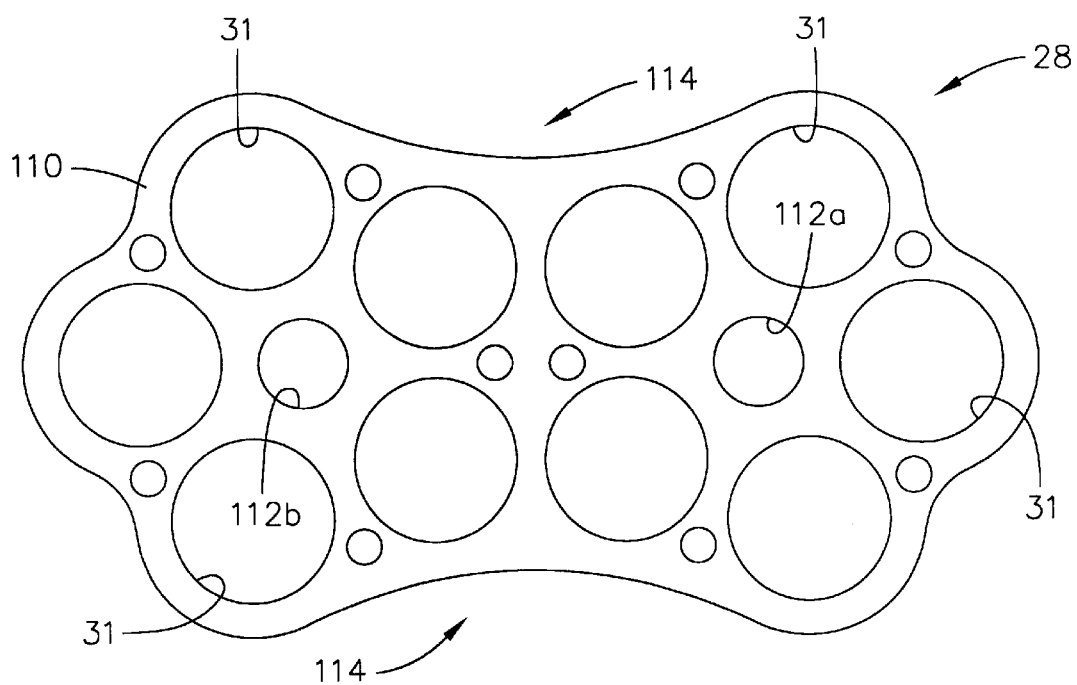
FIG. 11 is a top plan view of a retainer plate of a mold half of a mold assembly of the present invention.

As shown in FIG. 11, the retainer plate 28 has a body 110 with a curved perimeter to reduce mass. The body is preferably composed of cold-rolled steel, and preferably has a thickness between 0.1 and 0.2 inches. The retainer plate 28 is designed to secure the mold inserts 30 within the carrier plate 26 with the minimum amount of mass. The retainer plate 28 has an equal number of insert apertures 31 as the insert apertures 33 of the carrier plate 26. Further, the insert apertures 31 are smaller in diameter than the insert apertures 33 of the carrier plate 26. The retainer plate 28 also has two hub apertures 112a–b which allow for engagement of the bolts 86 with the nuts 88. Each set of insert apertures 31 is positioned about a hub aperture 112a–b. The insert apertures 31 are equidistant from their respective hub aperture 112, and equidistant from each other within the set. Preferably, each of the insert apertures 31 has a diameter that ranges from 2.00 to 3.00 inches. The retainer plate 28 is secured to the carrier plate 26 using conventional methods.

Figure 12:
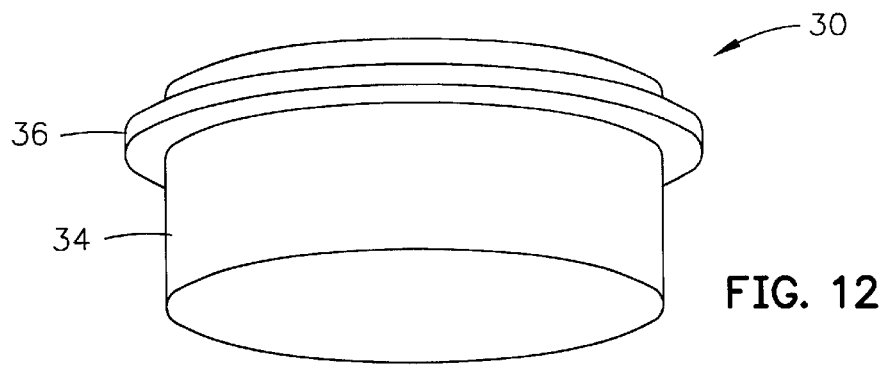
FIG. 12 is a side view of a mold insert of the mold assembly of the present invention.
Figure 13:
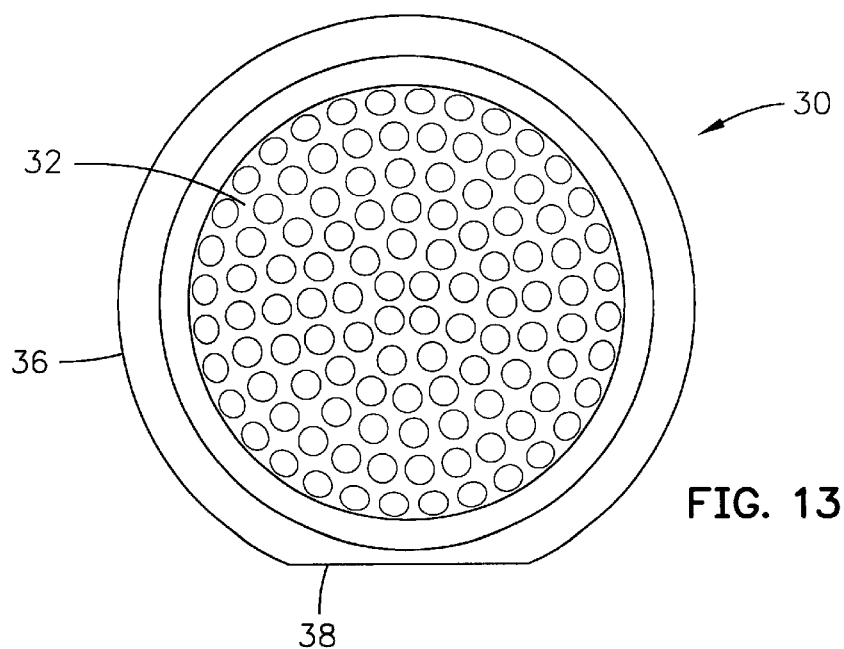
FIG. 13 is a top plan view of the mold insert of FIG. 12 illustrating the inverse dimple pattern of the cavity of the mold insert
Figure 14:
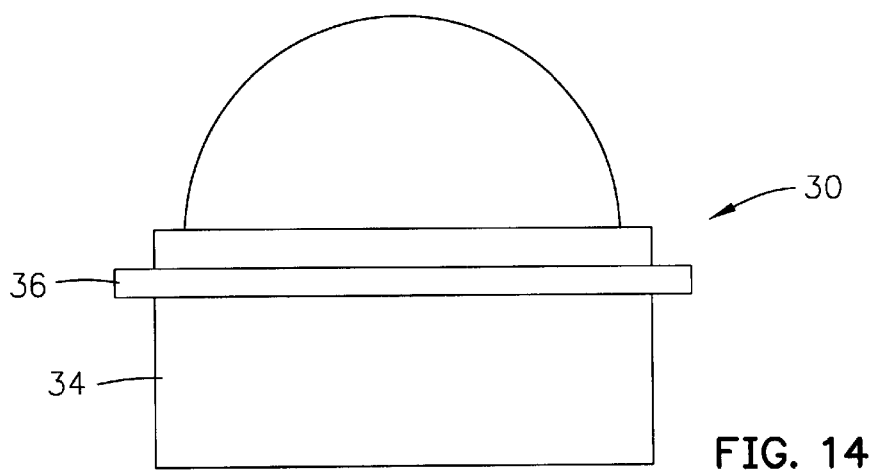
FIG. 14 is a side view of a mold insert of FIG. 12 with a golf ball precursor product therein.

FIGS. 12–14 illustrate the mold inserts 30 used with the mold assembly 20 of the present invention. Each mold insert 30 has a hemispherical cavity 32 within a body 34. Around a center height of the body 34 is an annular flange 36 that has an alignment flat 38 along a portion thereof The flange 36 is used for mounting each mold insert 30 on the carrier plate 26.

Figure 2:
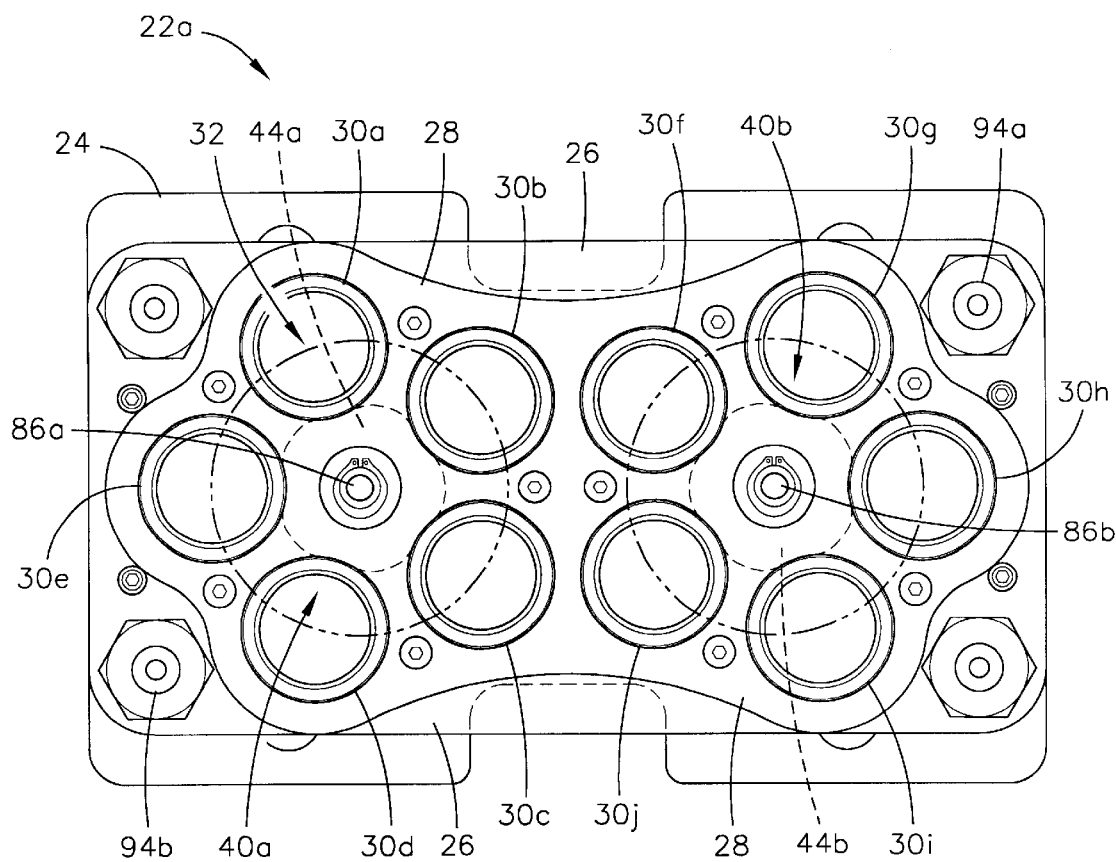
FIG. 2 is a top plan view of a first mold half of the mold assembly of FIG. 1.
Figure 3:
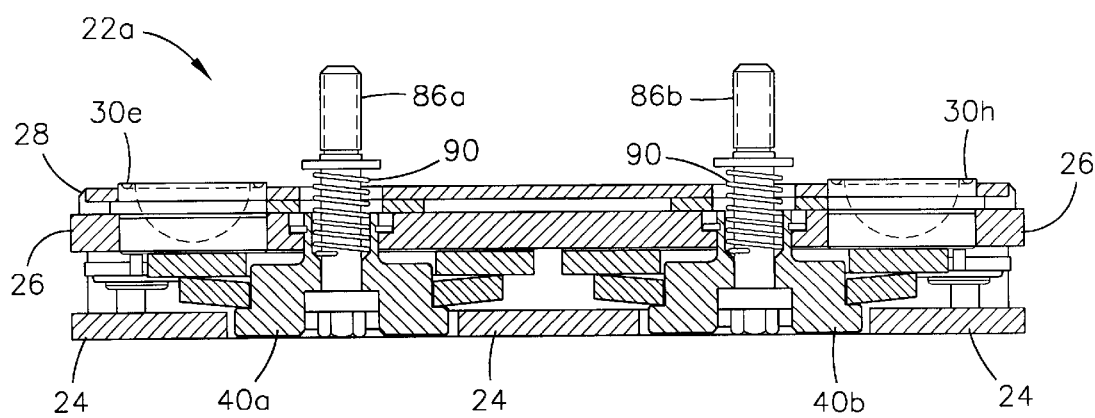
FIG. 3 is a cross-sectional view of the first mold half of FIG. 2.
Figure 4:
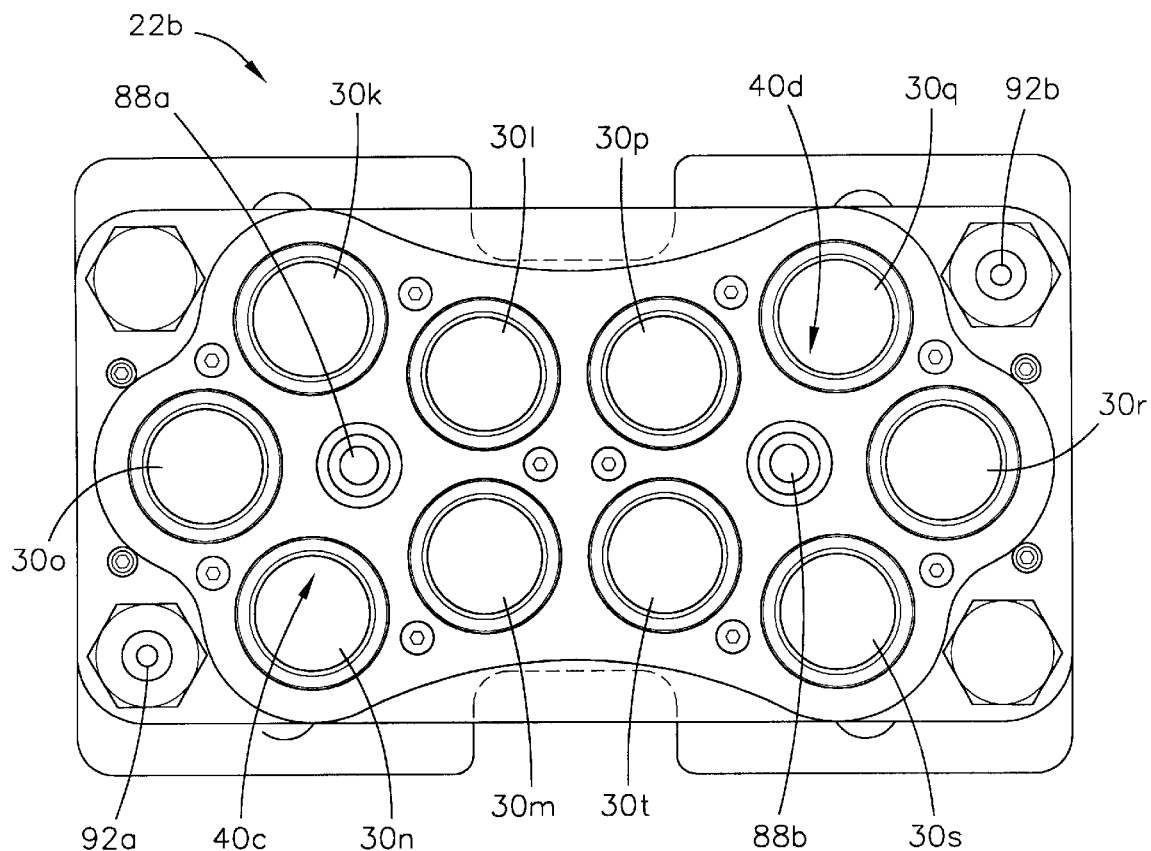
FIG. 4 is a top plan view of a second mold half of the mold assembly of FIG. 1.
Figure 5:
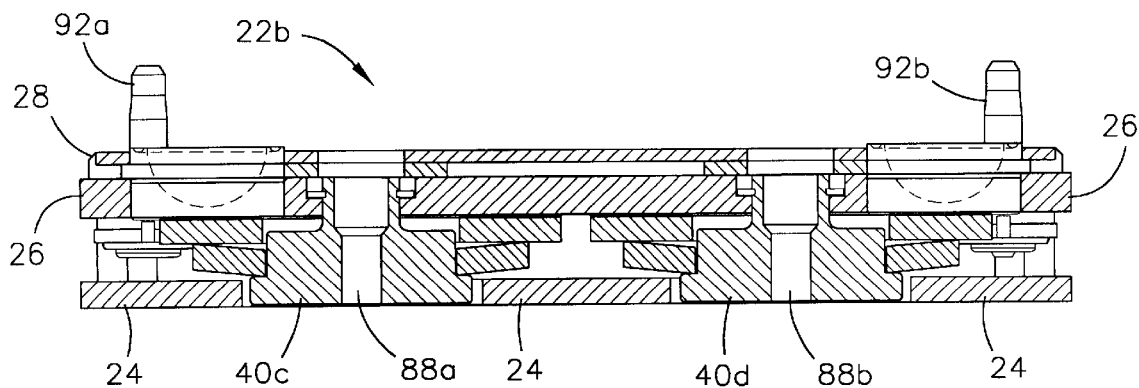
FIG. 5 is a cross-sectional view of the second mold half of FIG. 4.

The hemispherical cavity 32 preferably has an inverse dimple pattern thereon if a cover 27c is formed in the mold insert 30. However, the hemispherical cavity 32 will have a smooth surface if a boundary layer 27b is formed in the mold insert 30. The number of mold inserts 30 used for each mold half 22a–b may preferably range from eight to twelve, and is most preferably ten. In the preferred embodiment, as shown in FIGS. 2 and 4, five mold inserts 30a–e are positioned about hub mechanism 40a, five mold inserts 30f–j are positioned about hub mechanism 40b, five mold inserts 30k–o are positioned about hub mechanism 40c, and five mold inserts 30p–t are positioned about hub mechanism 40d. Those skilled in the art will recognize that more or less than five inserts may be positioned about each hub mechanism 40a–d without departing from the scope and spirit of the present invention.

Figure 15:
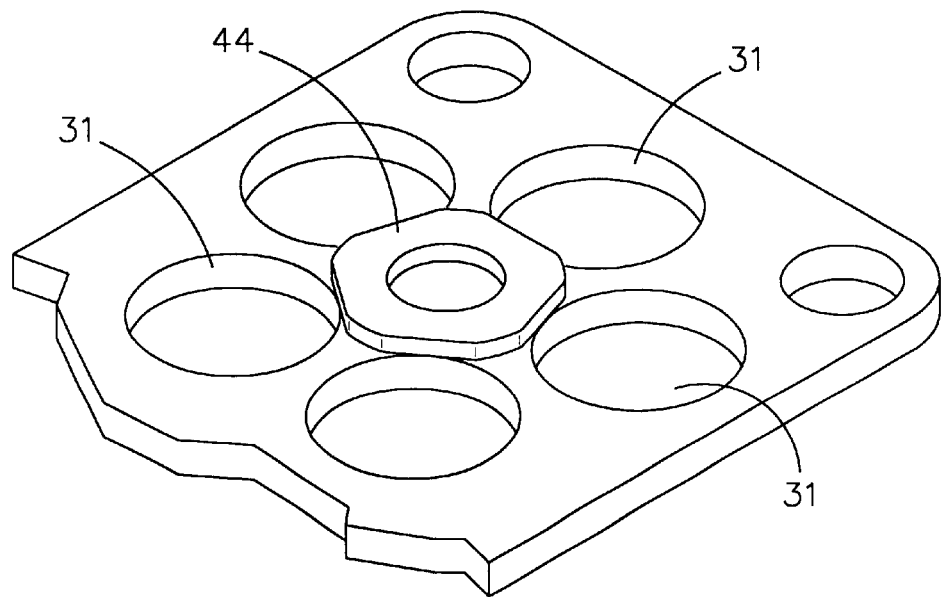
FIG. 15 is an enlarged top view of the retainer plate with an insert radial locating plate.
Figure 16:
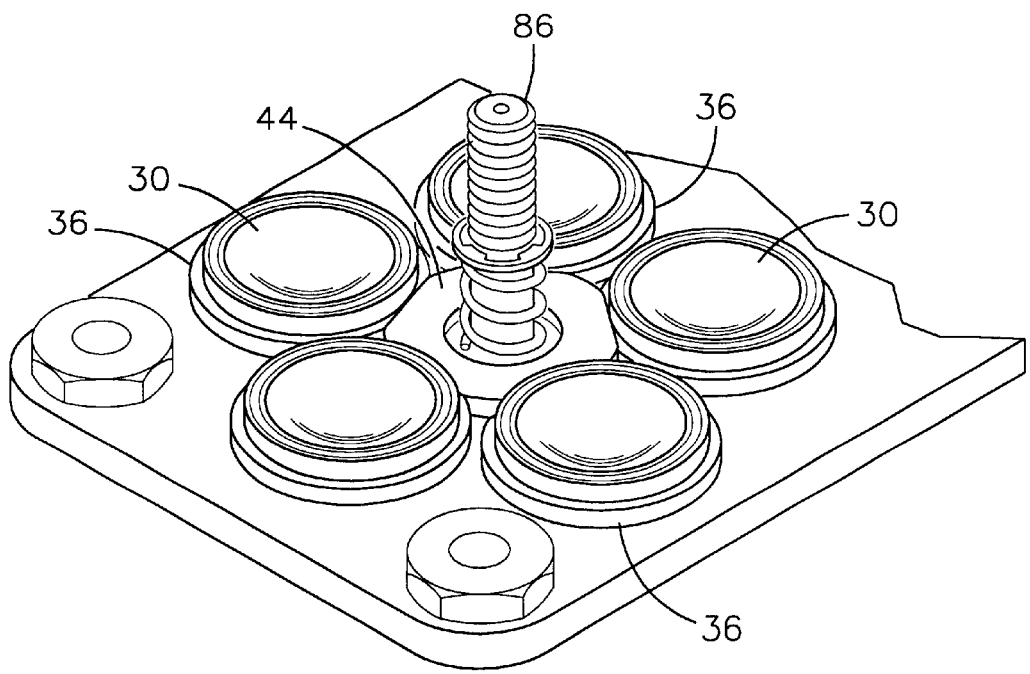
FIG. 16 is an enlarged view of a hub mechanism and mold inserts of a mold half of the mold assembly of the present invention.

As shown in FIGS. 15–16, each mold insert 30 of a set of mold inserts 30 is properly oriented using a insert radial locator plate 44 that is placed about the hub mechanism 40. Each insert radial locator plate 44a–d has straight edges to oppose the alignment flat 38 of each of the mold inserts 30. Once the locator plate 44 and the respective mold inserts 30 are aligned, the mold inserts 30 and the locator plate 44 are locked together to prevent rotation thereby ensuring that the top and bottom mold inserts 30 are oriented properly when mated, to produce the correct dimple pattern on the golf ball. Further, each mold insert may be a replaceable mold insert as set forth in U.S. Pat. No. 6,171,091, entitled Replaceable Mold Inserts For Golf Balls, which pertinent parts are hereby incorporated by reference.

In a preferred casting process, each cavity 32 of each mold insert 30a–j, is filled with a flowable polyurethane mixture. The mixture is allowed to gel, or partially cure, then a golf ball precursor product 25 is inserted in each of the mold inserts 30a–j of the first mold half 22a. During this time, the cavity 32 of the mold inserts 30k–t of the second mold half 22b, have received a predetermined quantity of the flowable polyurethane mixture. The first mold half 22a is then inverted and mated with the second mold half 22b to form the mold assembly 20 with each mold insert 30a–j of the first mold half 22a aligning with a corresponding mold insert 30k–t of the second mold half 22b. The bolts 86 are then preferably threadingly engaged with the nuts 88.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A mold assembly for forming a layer on a golf ball precursor product, the mold assembly comprising:

a first mold half comprising a first central hub mechanism having a first plurality of hemispherical cavities disposed circularly equidistant about the first central hub mechanism, a second central hub mechanism having a second plurality of hemispherical cavities disposed circularly equidistant about the second central hub mechanism, a carrier base having a plurality of studs extending from an interior surface, a carrier plate having a plurality of insert apertures with each having a first diameter and a plurality of hub apertures therein, the carrier plate disposed on the plurality of studs of the carrier base, and a retainer plate having a plurality of insert apertures with each having a second diameter, the retainer plate disposed on the carrier plate and each of the plurality of insert apertures positioned above a corresponding mold insert of the plurality of mold inserts and wherein the first diameter is greater than the second diameter; and a second mold half comprising a third central hub mechanism having a third plurality of hemispherical cavities disposed circularly equidistant about the third central hub mechanism, a fourth central hub mechanism having a fourth plurality of hemispherical cavities disposed circularly equidistant about the fourth central hub mechanism, a carrier base having a plurality of studs extending from an interior surface, a carrier plate having a plurality of insert apertures with each having a first diameter and a plurality of hub apertures therein, the carrier plate disposed on the plurality of studs of the carrier base, and a retainer plate having a plurality of insert apertures with each having a second diameter, the retainer plate disposed on the carrier plate and each of the plurality of insert apertures positioned above a corresponding mold insert of the plurality of mold inserts and wherein the first diameter is greater than the second diameter;

wherein the first and second central hub mechanisms engage with the third and fourth central hub mechanisms during mating of the first mold half with the second mold half.

2. The mold assembly according to claim 1 wherein each of the first and second mold halves has ten mold inserts.

3. The mold assembly according to claim 1 wherein each of the first and second mold halves has twelve mold inserts.

4. The mold assembly according to claim 1 further comprising at least one locator pin, the at least one locator pin adjusting from a molding position to a de-molding position for separation of the first mold half from the second mold half.

5. The mold assembly according to claim 1 wherein the first mold half further comprises at least one spring backing plate mechanism disposed between the first carrier base and the first carrier plate, and the second mold half further comprises at least one spring backing plate mechanism disposed between the second carrier base and the second carrier plate.

6. The mold assembly according to claim 1 further comprising a plurality of insert radial locating plates wherein each group of five or more of the plurality of mold inserts is restrained by an insert radial locating plate.

7. The mold assembly according to claim 6 wherein each mold insert has an annular flange with an alignment flat for engaging an insert radial locator plate.

8. The mold assembly according to claim 1 wherein the retainer plate has a curving perimeter that approximates the placement of each of the mold inserts.

9. A mold assembly for forming a layer on a golf ball precursor product, the mold assembly comprising:

a first mold half comprising a first carrier base having a plurality of studs extending from an interior surface, a first carrier plate having a plurality of insert apertures with each having a first diameter and a plurality of hub apertures therein, the first carrier plate disposed on the plurality of studs of the first carrier base, a plurality of mold inserts, each plurality of mold inserts disposed within a corresponding insert aperture of the plurality of insert apertures, and a first retainer plate having a plurality of insert apertures with each having a second diameter, the retainer plate disposed on the first carrier plate and each of the plurality of insert apertures positioned above a corresponding mold insert of the plurality of mold inserts and wherein the first diameter is greater than the second diameter; and a second mold half comprising a second carrier base having a plurality of studs extending from an interior surface, a second carrier plate having a plurality of insert apertures with each having a first diameter and a plurality of hub apertures therein, the second carrier plate disposed on the plurality of studs of the second carrier base, a second plurality of mold inserts, each plurality of mold inserts disposed within a corresponding insert aperture of the plurality of insert apertures, and a second retainer plate having a plurality of insert apertures with each having a second diameter, the retainer plate disposed on the second carrier plate and each of the plurality of insert apertures positioned above a corresponding mold insert of the plurality of mold inserts and wherein the first diameter is greater than the second diameter.

10. The mold assembly according to claim 9 further comprising a first plurality of hub mechanisms, each of the first plurality of hub mechanisms disposed within the plurality of hub apertures of the first carrier plate, and a second plurality of hub mechanisms, each of the second plurality of hub mechanisms disposed within the plurality of hub apertures of the second carrier plate, wherein the first plurality of hub mechanisms engage with the second plurality of hub mechanisms during mating of the first mold half with the second mold half.

11. The mold assembly according to claim 9 wherein each of the plurality of mold inserts has a hemispherical cavity with an inverse dimple pattern thereon.

12. The mold assembly according to claim 9 wherein each of the first and second mold halves has ten mold inserts.

13. The mold assembly according to claim 9 wherein each of the first and second mold halves has twelve mold inserts.

14. The mold assembly according to claim 9 further comprising at least one tapered pin, the at least one tapered pin having a double tapered top for separation of the first mold half from the second mold half.

15. The mold assembly according to claim 9 wherein the first mold half further comprises at least one spring backing plate mechanism disposed between the first carrier base and the first carrier plate, and the second mold half further comprises at least one spring backing plate mechanism disposed between the second carrier base and the second carrier plate.

16. The mold assembly according to claim 9 further comprising a plurality of insert radial locating plates wherein each group of five or more of the plurality of mold inserts is restrained by an insert radial locating plate.

17. A mold assembly for forming a layer on a golf ball precursor product, the mold assembly comprising:

a first mold half comprising a first carrier plate having a first hub aperture with a first plurality of insert apertures disposed circularly equidistant about the first hub aperture, and a second hub aperture with a second plurality of insert apertures disposed circularly equidistant about the second hub aperture, each of the first and second pluralities of insert apertures having a first diameter, a first plurality of mold inserts, each plurality of mold inserts disposed within a corresponding insert aperture of the first and second pluralities of insert apertures, and each of the first plurality of mold inserts having a cavity with an inverse dimple pattern, first and second hub bolts extending through first and second hub apertures; and a first retainer plate having a plurality of insert apertures with each having a second diameter, the retainer plate disposed on the first carrier plate and each of the plurality of insert apertures positioned above a corresponding mold insert of the plurality of mold inserts, wherein the first diameter is greater than the second diameter, and the first retainer plate having a first and second hub aperture for the first and second hub bolts to extend through; and a second mold half comprising a second carrier plate having a third hub aperture with a third plurality of insert apertures disposed circularly equidistant about the third hub aperture, and a fourth hub aperture with a fourth plurality of insert apertures disposed circularly equidistant about the fourth hub aperture, a second plurality of mold inserts, each of the second plurality of mold inserts disposed within a corresponding insert aperture of the third and fourth pluralities of insert apertures, and each of the second plurality of mold inserts having a cavity with an inverse dimple pattern, first and second hub receptors disposed within the third and fourth hub apertures for receiving the first and second hub bolts respectively; and a second retainer plate having a plurality of insert apertures with each having a second diameter, the second retainer plate disposed on the second carrier plate and each of the plurality of insert apertures positioned above a corresponding mold insert of the plurality of mold inserts, wherein the first diameter is greater than the second diameter, and the second retainer plate having a third and fourth hub apertures for the first and second hub bolts to extend through to engage the first and second hub receptors.

18. The mold assembly according to claim 17 wherein each of the first and second pluralities of mold inserts has ten mold inserts.

19. The mold assembly according to claim 17 further comprising at least one taper pin, the at least one taper pin adjusting from a molding position to a de-molding position for separation of the first mold half from the second mold half.

* * * * *